(12) United States Patent
Kaufmann et al.

(10) Patent No.: US 10,138,852 B2
(45) Date of Patent: *Nov. 27, 2018

(54) AIR FILTER ELEMENT

(71) Applicant: MANN+HUMMEL GMBH, Ludwigsburg (DE)

(72) Inventors: Michael Kaufmann, Meckenheim (DE); Klaus-Dieter Ruhland, Meckenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/588,874

(22) Filed: May 8, 2017

(65) Prior Publication Data

US 2017/0276100 A1    Sep. 28, 2017

Related U.S. Application Data

(63) Continuation of application No. 14/177,697, filed on Feb. 11, 2014, now Pat. No. 9,657,695, and a (Continued)

(30) Foreign Application Priority Data

Feb. 12, 2013   (DE) .......................... 10 2013 002 274
Feb. 12, 2013   (DE) .......................... 10 2013 002 275
(Continued)

(51) Int. Cl.
*B01D 46/24* (2006.01)
*F02M 35/08* (2006.01)
(Continued)

(52) U.S. Cl.
CPC .......... *F02M 35/084* (2013.01); *B01D 45/16* (2013.01); *B01D 46/0004* (2013.01);
(Continued)

(58) Field of Classification Search
CPC ............ B01D 46/0005; B01D 46/2411; B01D 46/2414; B01D 46/0004; B01D 46/008;
(Continued)

(56) References Cited

U.S. PATENT DOCUMENTS 6,419,718 B1 *   7/2002   Klug .................. B01D 46/0004
                                                        55/320
6,602,308 B1 *   8/2003   Carle ................. B01D 46/0024
                                                        123/198 E (Continued)

*Primary Examiner* — Robert Clemente
(74) *Attorney, Agent, or Firm* — James Hasselbeck

(57) ABSTRACT

The invention relates to a filter element (10), comprising a filter body (12) in concentric form having a longitudinal axis (L), a first end disk (16) situated on one end face (15), and a second end disk (18) situated on the opposite end face (17), and a support tube (14) situated concentrically around the longitudinal axis (L) between the first and the second end disks (16, 18). At least one of the end disks (18) may have support knobs arranged in a circular arrangement about the longitudinal axis and extending in axial direction outwardly. The at least one end disk may have a centering element (22) that is situated around the longitudinal axis (L), as a result of which the filter element (10) can be radially centered during installation in the housing (108). A support structure (20) may be provided on the at least one end disk (18) which is concentric with respect the centering element (22) and is provided for at least axially supporting the filter element (10) in the housing (108). The invention further relates to a filter system (100) for exchangeably installing such a filter element (10).

18 Claims, 11 Drawing Sheets

Related U.S. Application Data continuation of application No. 14/993,352, filed on Jan. 12, 2016, which is a continuation of application No. 14/178,601, filed on Feb. 12, 2014, now Pat. No. 9,233,333.

(60) Provisional application No. 61/815,214, filed on Apr. 23, 2013.

(30) Foreign Application Priority Data

| Feb. 12, 2013 | (DE) | .................. | 10 2013 002 276 |
| Feb. 12, 2013 | (DE) | .................. | 10 2013 002 277 |
| Feb. 12, 2013 | (DE) | .................. | 10 2013 002 278 |

(51) Int. Cl.
| *B01D 46/00* | (2006.01) |
| *B01D 46/52* | (2006.01) |
| *B01D 45/16* | (2006.01) |
| *B01D 50/00* | (2006.01) |
| *F02M 35/02* | (2006.01) |
| *F02M 35/022* | (2006.01) |
| *F02M 35/024* | (2006.01) |
| *B01D 46/42* | (2006.01) |

(52) U.S. Cl.
CPC ....... *B01D 46/0005* (2013.01); *B01D 46/008* (2013.01); *B01D 46/0041* (2013.01); *B01D 46/2411* (2013.01); *B01D 46/2414* (2013.01); *B01D 46/4227* (2013.01); *B01D 46/523* (2013.01); *B01D 50/002* (2013.01); *F02M 35/0205* (2013.01); *F02M 35/0214* (2013.01); *F02M 35/0216* (2013.01); *F02M 35/0223* (2013.01); *F02M 35/0245* (2013.01); *F02M 35/02416* (2013.01); *F02M 35/02425* (2013.01); *F02M 35/02483* (2013.01); *F02M 35/08* (2013.01); *B01D 2265/021* (2013.01); *B01D 2265/06* (2013.01)

(58) Field of Classification Search
CPC ....... F02M 35/02416; F02M 35/02425; F02M 35/02483
See application file for complete search history.

(56) References Cited

U.S. PATENT DOCUMENTS

| 9,233,333 | B2 * | 1/2016 | Kaufmann | ......... | B01D 46/0004 |
| 2002/0112459 | A1 * | 8/2002 | Andress | ............ | B01D 46/0024 |
| | | | | | 55/498 |
| 2012/0324849 | A1 * | 12/2012 | Ackermann | ....... | B01D 46/2414 |
| | | | | | 55/492 |

* cited by examiner

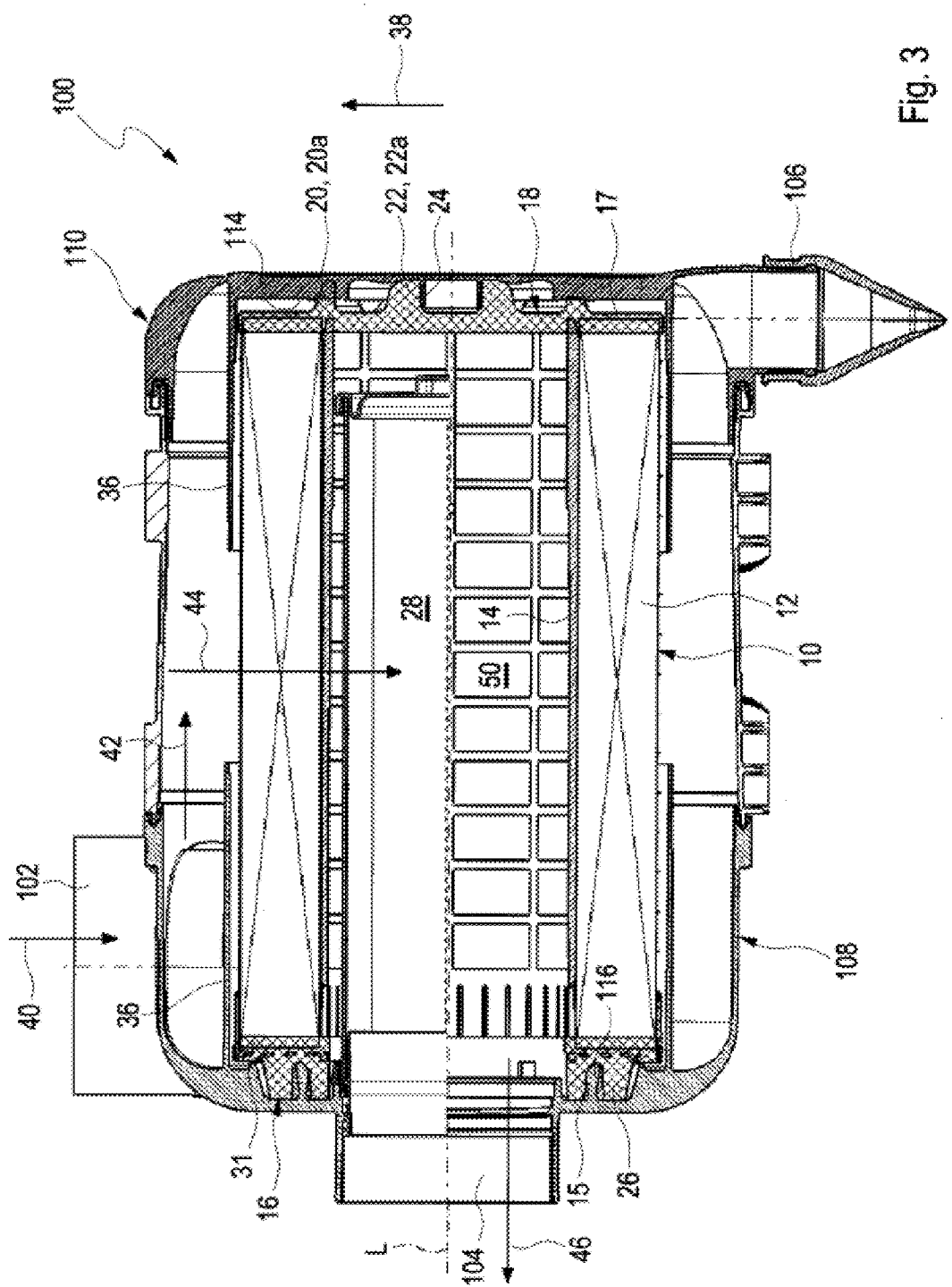

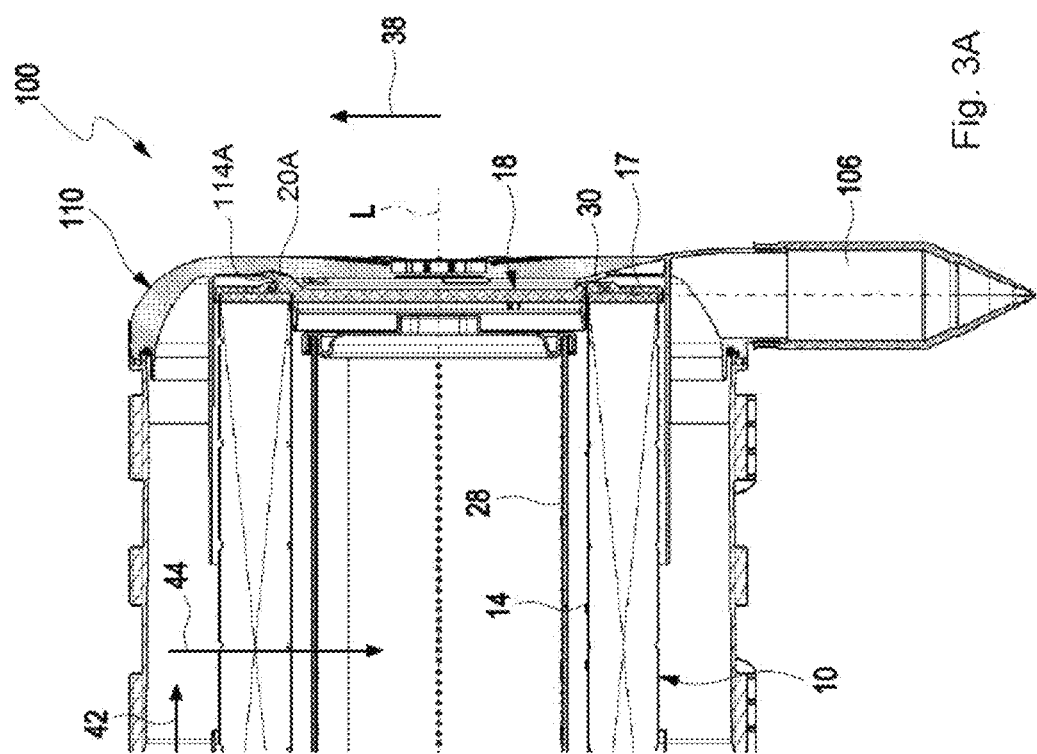

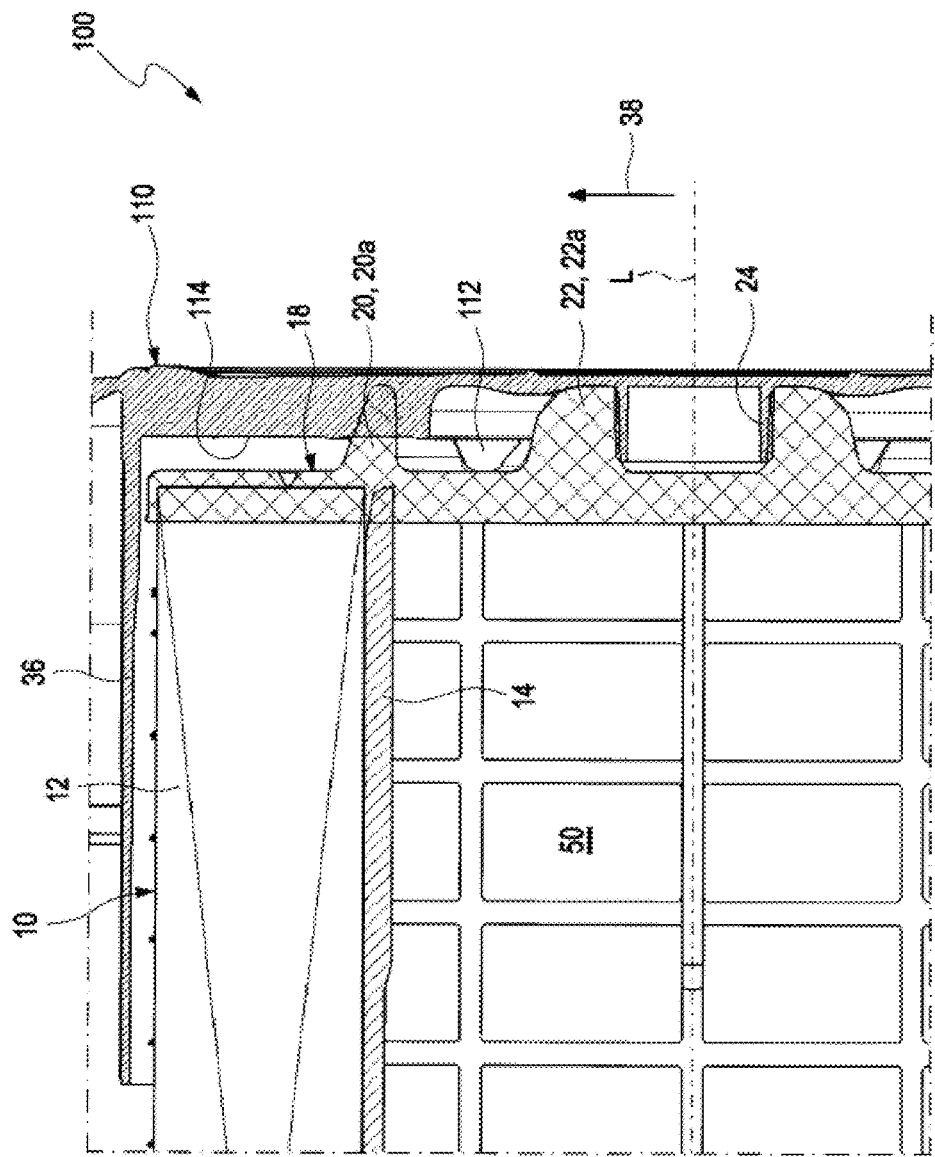

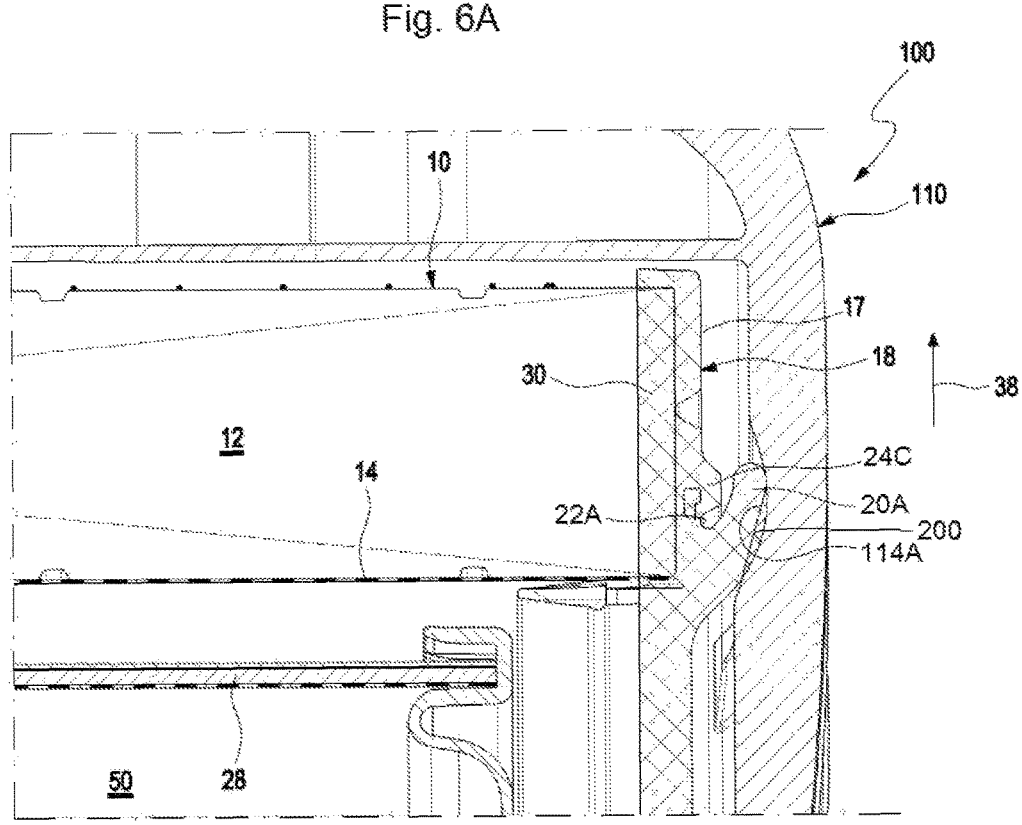

AIR FILTER ELEMENT

CROSS-REFERENCE TO RELATED APPLICATIONS

This application is a Continuation of U.S. patent application Ser. No. 14/177,697, filed: Feb. 11, 2014, which claims the benefit of U.S. Provisional Application No. 61/815,214 filed: Apr. 23, 2013. U.S. patent application Ser. No. 14/177,697 claims foreign priority under 35 USC 119(b) to prior filed German patent applications 10 2013 002 274.6 filed Feb. 12, 2013; 10 2013 002 275.4 filed Feb. 12, 2013; 10 2013 002 277.0 filed Feb. 12, 2013; 10 2013 002 278.9 filed Feb. 12, 2013; and 10 2013 002 276.2 filed Feb. 12, 2013, the entire contents of the aforesaid U.S. Applications and the aforesaid German patent applications being incorporated herein by reference to the fullest extent permitted under the law.

This application is a Continuation of U.S. patent application Ser. No. 14/993,352, filed: Jan. 12, 2016, which is a Continuation of U.S. patent application Ser. No. 14/178,601, filed Feb. 12, 2014 and is now U.S. Pat. No. 9,233,333, issued: Jan. 12, 2016, which claims priority to U.S. Provisional Patent Application No. 61/815,214, filed: Apr. 23, 2013 and claims foreign priority under 35 USC 119(b) to prior filed German patent applications 10 2013 002 274.6 filed Feb. 12, 2013; 10 2013 002 275.4 filed Feb. 12, 2013; 10 2013 002 277.0 filed Feb. 12, 2013; 10 2013 002 278.9 filed Feb. 12, 2013; and 10 2013 002 276.2 filed Feb. 12, 2013, the entire contents of the aforesaid U.S. Applications and the aforesaid German patent applications being incorporated herein by reference to the fullest extent permitted under the law.

TECHNICAL FIELD

The invention relates to an air filter element, in particular for use as an air filter of an internal combustion engine, and a filter system for installing such a filter element.

BACKGROUND

A filter element is known from WO 2009/047196 A1 in which the configuration of the seals of the filter element, having two ring bead-shaped arrangements and a sealing groove therebetween, ensures that on the one hand a sealing effect is achieved, and on the other hand, axial support of the filter element in a housing is achieved. Specifically when using plastic for sealing onto elements exposed to vibrations, a design is required which functions reliably even under extreme temperature fluctuations.

Furthermore, WO 2009/047196 A1 describes a filter system comprising a filter element. This filter system serves in particular for filtering the intake air of an internal combustion engine, and comprises a housing and a cover for accommodating the filter element. The filter system is provided with two annular grooves which in the region of the seal communicate with the sealing contours of the filter element.

An air filter arrangement is known from DE 20 2008 018 217 U1, having an air filter housing and an air filter cartridge. The housing seal at the open end of the air filter cartridge has a seal that is directed radially inwardly. At the closed end of the air filter cartridge, there is a projecting/receiving arrangement that prevents the air filter cartridge from rotating in the housing during operation, and which allows an association of the air filter cartridge with a certain type of air filter. A counterpiece of the arrangement is attached to the second end of the air filter cartridge, the other counterpiece being part of a housing cover. The projecting/receiving arrangement is composed of a wound ring element which has alternating convex and concave sections and which engages in a counterpiece having a shape that is the negative thereof.

SUMMARY

The filter elements of air filters are usually replaced after a certain operating time. Depending on the amount of dust, the service life of a filter can range from a few days (construction machines) to several months.

Reliable sealing of the filer element with high process reliability in a housing is important in particular when filter elements are replaced frequently. The sealing should be implemented in a temperature-resistant and vibration-proof manner. In addition, sealing of the filter element must be ensured in plants or installations which are exposed to excessive vibrations or shocks. At the same time, however, the filter element itself should preferably not contain any metallic elements so that it can be easily disposed of by thermal means.

It is an object of the invention to provide a filter element which has reliable sealing between the region of the unfiltered medium and the region of the filtered medium, and which ensures secure mountability, in particular when the filter element is frequently replaced.

A further object of the invention is to provide a filter system for accommodating such a replaceable filter element, which provides reliable sealing and secure mountability.

In advantageous embodiments, the at least one of the end disks has one or several support knobs which are arranged in a circular arrangement about the longitudinal axis and extend axially outwardly and, upon installation in a housing for receiving the filter element, fold outwardly in radial direction as they are contacting an inner cover contour of the housing and are axially and radially supported on the housing.

In contrast to the prior art where only support knobs are known which either deform axially or deform radially in inward direction, the support knobs have the property that the filter element, because of the supporting action in radial and axial directions, is secured safely in its position even when the housing is subjected to strong vibrations. The deliberate strong radial deformation component of the support knobs enables a very good centering action of the filter element. Also, by bending the support knobs outwardly in radial direction, tangential forces are generated that produce greater stiffness and restoring forces. This is in particular beneficial for larger and thus heavier air filter elements particularly in the field of construction machinery or agricultural machinery and optimizes also multiple installation and removal of the filter element during servicing.

When using such a filter element in the field of construction machinery or agricultural machinery, loading of the filter with dust and dirt particles is very high so that the weight of a loaded filter element may increase by several kilograms. The filter element as well as the corresponding filter system must therefore be designed to be appropriately robust.

In a beneficial embodiment, one or several support knobs can be arranged such that upon installation in the housing they can mesh with and elastically engage with rib-shaped projections in the inner cover contour of the housing. With such a meshing action, a securing action against rotation of the filter element in the housing is provided so that the positional stability of the filter element in case of vibration excitation in operation is greatly enhanced. Conceivable is also a spacer knob that is arranged annularly about the longitudinal axis.

Advantageously, the second end disk in radial direction outside of the support knobs can have a relief groove so that folding of the support knobs upon mounting in the housing and closure of the cover is facilitated. The deformability of the support knobs can be favorably affected by the relief groove. The relief groove can be arranged concentrically to the longitudinal axis.

Expediently, the second end disk in radial direction may have outside or inside of the support knobs and/or the relief groove a projection for supporting the support knobs which fold over outwardly in radial direction. When a support knob is elastically olded during installation, the support knob experiences due to the contact on the projection a support action providing an axial force for compensating the axial force exerted by the filter element. In this way, the filter element can be clamped safely and stably. The projection acting as a stop prevents "over-deformation" (excessive deformation) of the support knobs; such excessive deformation might cause buckling and complete loss of restoring action. The projection can be designed e.g. as a ring concentric to the longitudinal axis. It is also conceivable to divide the projection into segments that correspond positionally to the position of the support knobs.

According to one aspect of the invention, the filter element in which at least one of the end disks has a centering element situated around the longitudinal axis, as a result of which the filter element can be radially centered during installation, and on the at least one end disk a support structure is provided which is concentric with respect to the centering element and which is provided for at least axially supporting the filter element in the housing, and according to another aspect of the invention the objects are achieved by a filter system having such a filter element.

A filter element is proposed which comprises a filter body in concentric form having a longitudinal axis, a first end disk situated on one end face and a second end disk situated on the opposite end face, and a support tube situated concentrically around the longitudinal axis between the first and the second end disks.

According to the invention, at least one of the end disks has a centering element that is situated around the longitudinal axis, by means of which the filter element can be radially centered during installation, on the at least one end disk a support structure being provided that is concentric with respect to the centering element for at least axially supporting the filter element in the housing. The centering element and/or the support structure are preferably configured as one piece with the end disk and as a part thereof.

In an alternative embodiment, the centering structure can also be configured in such a way that it can take over the axial support function of the support contour.

In a preferred embodiment, the centering element and/or the support structure is/are situated radially in the region of the support tube.

The centrally situated centering element has the advantage that for centrally radially guiding the filter element, in particular in large filter elements, narrower tolerances can be taken into account compared to a guide situated on the outer edge of the filter elements. Also, through this separation of the centering function and the support function, the filter element may be very advantageously mounted in the housing, since in this manner, first the centering function takes place, which can be carried out with low mounting force, and only thereafter, bracing the filter element in the housing can take place via the support function. In this manner, the filter element is already placed at the correct location during the force-fit mounting, and a potential correction of the position under tension is no longer required, which otherwise could result in damage to the sealing and/or centering elements of the filter element.

This is advantageous for larger and thus heavier filter elements, in particular for the construction or agricultural machinery sector, and it also optimizes repeated removal and installation of the filter elements during service. When such a filter element is used in the construction or agricultural machinery sector, the load on the filter due to dust and dirt particles is very high, so that the weight of a loaded filter element can increase by several kilograms. Thus, the filter element as well as the associated filter system must have an appropriately robust design.

Also, the ability to associate the filter element with a filter system is to be implemented via the shape of the centering element and its counterelement in the cover of the housing, so that the correct filter element is automatically used for the filter system, and an incorrect spare part cannot be installed.

The centering element preferably extends axially away from the end face of the in particular substantially flat end disk that faces away from the interior of the filter element.

In an advantageous embodiment, the support structure and/or the centering element can form anti-twist protection for the filter element. The support structure as well as the centering element can advantageously be made of a soft elastic plastic which allows, for example, that edges of a cover cut into the plastic, thereby enabling a firm fixation of the filter element with respect to twisting, even in the case of shocks during operation. Due to such an anti-twist protection, the seals on the filter element and on the housing are subjected to less load, and the service life of the filter element can therefore be increased.

The support structure can advantageously be situated in such a way that during installation in the housing, the support structure can be interlocked with rib-shaped elevations in an inner cover structure of the housing. Through such interlocking, anti-twist protection of the filter element in the housing is provided, thus greatly enhancing the position stability of the filter element in the event of vibration excitation during operation.

The at least one end disk can advantageously have a centering ring as a centering element, which interacts with a counterelement situated in a cover of the housing during installation in a receiving housing, as a result of which the filter element can be radially centered and guided during installation in the housing. The advantage of a centering ring as the centering element is the relatively simple fabrication of such a structure, since the corresponding injection molding tool can be kept simple. Furthermore, the filter element can be mounted in the housing without precise rotational positioning, since due to a centering ring, the arrangement has a rotational symmetrical design. Specifically in the case of heavy filter elements for construction and agricultural machinery, such simple mountability is advantageous. The counterelement in the cover provides for accurate radial guidance without requiring significant effort.

In one advantageous embodiment, the support structure, viewed in the radial direction, can be situated outside the centering element. A clear separation between the centering function and the support function is thus provided. Due to the spatial separation, the centering function can be carried out without significant effort, since the force for bracing so as to support the filter element in the housing is transmitted into the end disk at a different location, which makes mounting of the filter element much easier.

The at least one end disk can advantageously have support knobs which during installation in the housing bend inwardly or outwardly in the radial direction in contact with an inner cover contour of the housing and form an axial support on the housing. In contrast to the prior art, in which support knobs are known that deform axially, these support knobs have the property that, due to the supporting effect in the axial and radial directions, the filter element is held firmly in position, even in the case of severe vibrations. The deliberately strong radial deformation component enables very good support for the filter element. Moreover, due to the radial bending of the support knobs, tangential tensile forces are formed which result in greater stiffness and higher elastic recovery forces. This is advantageous in larger and thus heavier filter elements, in particular for the construction or agricultural machinery sector, and it also optimizes repeated removal and installation of the filter elements during service.

In another advantageous embodiment, the at least one end disk can have support knobs as a centering element, during installation in a receiving housing the support knobs interacting with a counterstructure situated in a cover of the housing, as a result of which the filter element can be radially centered and guided during installation in the housing. In this embodiment, the support knobs can provide the function of pre-centering when mounting the filter element in the housing, and in this pre-mounting phase, they can result in the filter element already being guided with relatively little effort into the correct position prior to closing the cover. In this manner, sealing the filter element with respect to the housing in the intended position can be more reliably ensured than if the filter element were guided into position only during final closing of the cover.

The support structure, viewed in the radial direction, can advantageously be situated within the centering element. Guiding the filter element for pre-centering can be done more easily due to the greater leverage of a centering element that is located farther out, and due to the support structure that is located closer toward the inside, greater force can be applied for bracing.

The at least one end disk can advantageously have a closed ring as a support structure which during installation in the housing lies against an inner cover contour of the housing and forms a radial and axial support structure on the housing. In terms of manufacturing, a closed ring can be easily implemented, requires no exact rotational positioning of the filter element during mounting in the housing, and has a stable structure for the support function in the radial and axial directions, without having a preferred rotational direction.

In one advantageous embodiment, the centering element can be situated such that during installation in the housing, it can interlock with rib-shaped elevations in the inner cover contour of the housing. Simple anti-twist protection of the filter element in the housing can be implemented in this manner. Interlocking can take place by means of a form-locked connection with a centering element that is interrupted in a segment-like manner, for example, or by means of a force-locked connection when rib-shaped elevations of the cover cut into the soft elastic material of a centering element.

The second end disk as well as the first end disk can advantageously be made of a polyurethane foam or an elastomer. Of course, there is also the possibility of producing the end disk from a plurality of plastic components to thus ensure optimum deformability over a wide temperature range, as can occur during use in practice. For instance, thermoplastic plastics are also possible. Both end disks can be welded or adhesively bonded to the filter body to achieve a stable connection.

The first end disk can advantageously have radial sealing with respect to the housing. This has the advantage that in addition to good sealing and thus a reliable filtering effect, double-radial guidance of the filter element in the housing can be achieved by the radial sealing and the radial bracing of the support knobs in the cover, resulting in very stable mounting of the filter element in the housing.

The filter element can advantageously be used as an air filter, in particular as an air filter of an internal combustion engine. Reliable operation of internal combustion engines is also based on reliable, optimal filtering of the intake air for the combustion operation. The filter element described represents a cost-effective option for this purpose.

It is likewise advantageous to use the filter element as a particle filter, in particular as an oil filter or fuel filter of an internal combustion engine. Here as well, secure mounting and cost-effective exchangeability of the described filter element are of vital importance.

According to another aspect, the invention relates to a filter system that has a filter element according to any one of the preceding claims, comprising a housing which is substantially concentric around a longitudinal axis, a cover which closes the housing and likewise is concentric around the longitudinal axis, and which on its inner side has a counterelement and/or a cover contour which interacts with a centering element of the at least one end disk, and on its inner side the cover having a cover contour on which a support structure of the at least one end disk can be contacted and supported, an inlet that is situated on the housing and/or the cover for feeding the medium to be filtered, in particular air, wherein an outlet is provided on the housing, concentric with respect to the longitudinal axis, for discharging the filtered medium, in the region of the outlet a sealing contour being provided on the housing which corresponds to the radial seal of the first end disk of the filter element, the filter element being situated in an exchangeable manner in the housing of the filter system.

The essential advantage of such a filter system is the secure and stable mounting of the filter element as well as very cost-effective exchangeability of the filter element when servicing is required. Specifically in the case of a short service life, which may occur in agricultural and construction machinery applications, fast exchangeability is of great importance.

A cyclone separator can advantageously be provided in the region of the inlet of the filter system, and a dirt outlet can be provided on the housing or on the cover. This cyclone separator is composed of a guide geometry that sets the medium to be filtered in rotation. Due to this rotation, the dirt accumulates in the region of the housing wall and is discharged at a suitable location via a dirt outlet. The service life of the actual filter element can be significantly extended by pre-separating the majority of the dirt from the air to be filtered.

According to another embodiment of the invention, a secondary element can be situated inside the filter element. The secondary element, which can be composed of a bearing structure that is lined with a permeable filter medium, for example a nonwoven, has the function of keeping the outlet of the filter system closed when changing the filter element so that no dirt can penetrate into this region while the filter element is being cleaned or replaced. In a preferred configuration, the secondary element is connected to the housing via a screw connection, and is provided with a seal that seals with respect to the housing.

BRIEF DESCRIPTION OF THE DRAWINGS

Further advantages are apparent from the following description of the drawings. The drawings illustrate exemplary embodiments of the invention. The drawings, the description and the claims contain numerous features in combination. The person skilled in the art will also advantageously consider the features individually and combine them into further meaningful combinations.

In the figures, by way of example:

FIG. 3 shows a longitudinal section through a filter system according to one exemplary embodiment of the invention, having a tangential inlet, a central outlet, and a dirt outlet at the bottom;

FIG. 3A is a longitudinal section view of the filter system according to an embodiment of the invention with tangential inlet, central outlet, and dirt outlet at the bottom, the embodiment having segment-shaped interrupted support knobs on the second end disk;

FIG. 6 shows a partial longitudinal section of a filter system according to one exemplary embodiment of the invention, having a centering ring and support knobs in the second end disk;

FIG. 6A is a partial cross-section view of the filter element consistent with the embodiment of FIGS. 3A and 4A, illustrated in the mounted state, with radially outwardly folded support knobs;

DETAILED DESCRIPTION

In the figures, identical or similar components are designated by the same reference numbers. The figures merely show examples, and are not to be construed as limiting.

Figure 1:
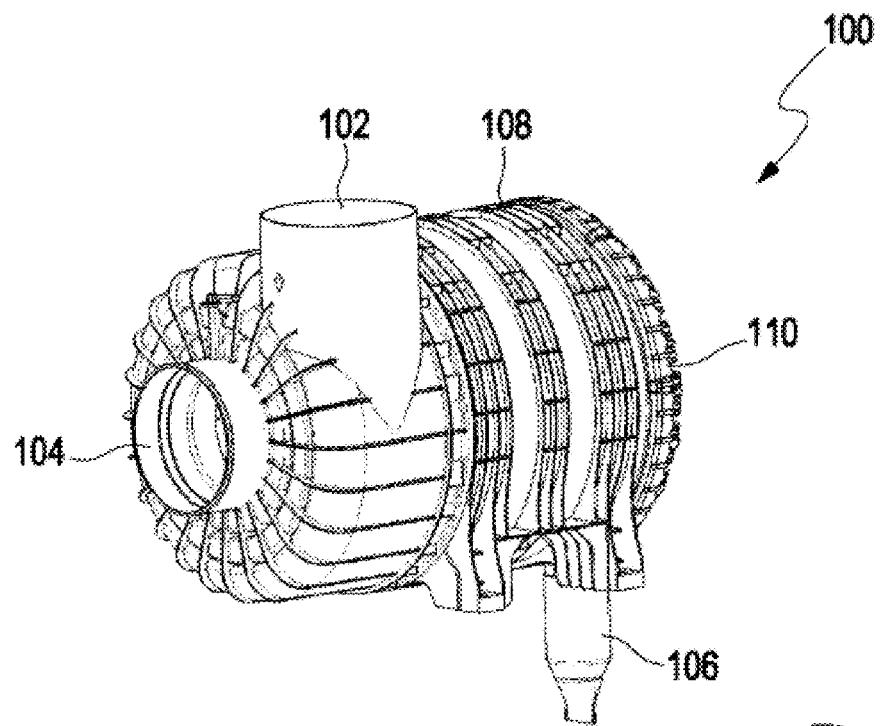
FIG. 1 shows a perspective view of a filter system according to one exemplary embodiment of the invention, having a tangential inlet, a central outlet, and a dirt outlet at the bottom.

FIG. 1 shows a perspective view of a filter system 100 according to one exemplary embodiment of the invention, having a tangential inlet 102, a central outlet 104 on a front side of the housing, and a dirt outlet 106 at the bottom. Illustrated is a round filter design composed of a housing 108 that is closed with a cover 110, for example by means of a screw coupling or bayonet coupling.

For use as an air filter system, dust-laden air flows into the inlet 102, which is situated tangentially with respect to the air filter element installed inside, so that the air in the interior of the housing 108 is set in rotary motion by an inflow protection element that partially encloses the filter medium. The filter element and the inflow protection element are not illustrated in the drawing. Due to the cyclone effect brought about by the rotary motion of the air, centrifugal forces act on the dust particles in the flowing air, so that these particles partially deposit on the housing wall and can flow out of the filter system 100 through the dirt outlet 106. As a result, the filter element is subjected to less load, and the service life of the filter element is increased. The cleaned air can be discharged from the housing 108 via the central outlet 104.

Figure 2:
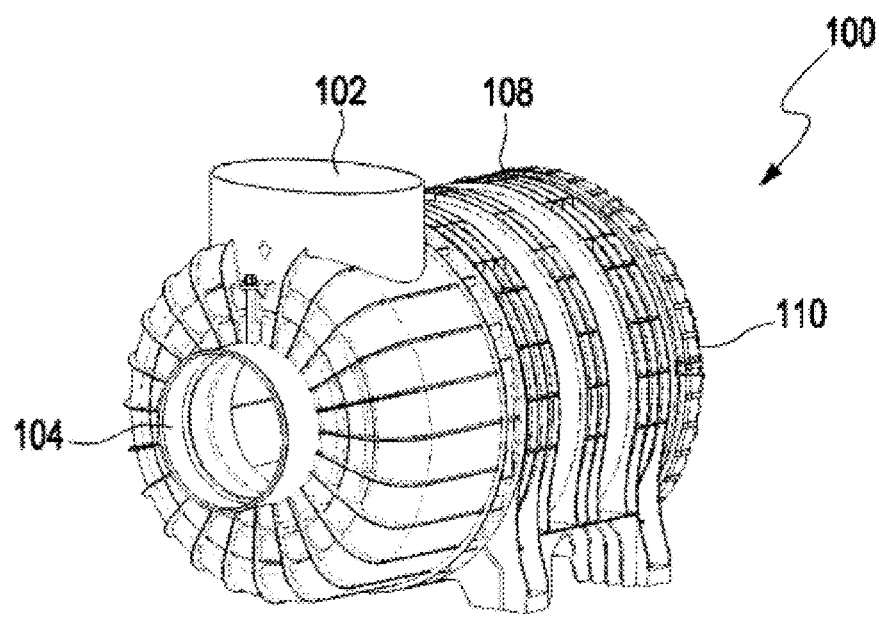
FIG. 2 shows a perspective view of a filter system according to one exemplary embodiment of the invention, having a radial inlet and a central outlet.

FIG. 2 shows a perspective view of a filter element 100 according to one exemplary embodiment, having an inlet 102 on the cover side and a central outlet 104. Also illustrated is a round filter design composed of a housing 108 which is closed with a cover 110. The inlet, through which dust-laden air can enter the housing, in this case is situated centrally above the interiorly mounted filter element. The outlet 104 through which cleaned air can flow out is likewise situated centrally, as in FIG. 1.

Such filter systems as illustrated in FIGS. 1 and 2 are usually used in the construction and agricultural machinery sector. They are characterized by a high degree of robustness, and have a short service life due to the high filter load. A filter system 100 having a loaded filter element must tolerate an increase in weight of 10 kg or more.

FIG. 3 illustrates a longitudinal section through a filter system 100 according to one exemplary embodiment, having a tangential inlet 102, a central outlet 104, and a dirt outlet 106 at the bottom. The housing 108 of the filter system 100 is closed with a cover 110. A filter element 10, which comprises a support tube 14 and a filter body 12 that are situated concentrically with respect to a longitudinal axis L, is closed off on two opposite end faces 15, 17 by first and second end disks 16, 18, respectively, which for example can be made of pourable polyurethane, in particular polyurethane foam, or an elastomer. The second end disk 18 and the support tube 14 of the filter element 10 can also be made as one piece. For example, the filter body 12 can be zigzag-folded as a closed ring, and can be made of paper, paper reinforced with carbon fibers, and/or paper comprising one or more layers of plastic fibers.

The second end disk 18 has a centrally arranged centering element 22 (illustrated as a centering ring 22a in the figure) which, after insertion of the filter element 10 into the housing 108 and closing the cover 110, encloses a centrally arranged counterelement 24 and thus effects radial guidance of the filter element 10 during the installation in the housing 108, and also subsequently during operation of the filter system 100. Furthermore, the second end disk 18 has support knobs 20a as a support element 20, which in the radial direction 38 are arranged circularly around the longitudinal axis L outside the centering element 22, and which during installation in the receiving housing 108 lie against a slanted surface or truncated conical section formed by an inner cover contour 114 of the cover 110 and bend inwardly and/or outwardly in the radial direction 38 and thereby support axially on the housing 108. In this manner, the filter element 10 is firmly fixed in the radial and axial directions in the housing 108 after the cover 110 is closed.

On the opposite end face 15 of the filter element 10, on the first end disk 16, whose stability is increased by a reinforcement ring 31, a radial seal 26 is mounted by means of which the filter element 10 is radially supported on the housing 108 via the sealing contour 116 and seals the unfiltered air space with respect to the filtered air space. Thus, the filter element 10 is braced axially and also twice radially against the housing 108.

Dust-laden air can flow in through the inlet 102 in the direction of the arrow 40, the inlet being illustrated in this case as a tangential inlet which enables a cyclone operation due to the rotary motion of the air brought about by means of a cyclone separator 36. Due to the rotary motion, dust particles can be partially pre-separated and deposited on the inner housing wall, and when the filter housing 108 is installed in the horizontal position, they can be emptied downwardly by gravity from the filter system 100. During operation after partial separation of the dust particles, the air flows through the filter body 12 in the direction of the arrows 42, 44 into the interior 50 of the filter element. Depending on the filter medium, dust particles above a certain size are caught in the filter medium.

Depending on the dust input, the filter element 10 therefore has to be replaced after a certain service life.

The filtered air flows out through the outlet 104 in the direction of the arrow 46. Mounted in the interior 50 of the filter element 10 is a secondary element 28 which essentially comprises a bearing structure having a relatively permeable filter medium, for example a nonwoven, and which remains in the housing 108 during replacement of the filter element 10 so as to protect the further air supply, for example of an internal combustion engine, against penetrating dust particles and other objects. For example, the secondary element 28 is screwed with a screw part into the portion of the housing 108 at the outlet side.

The filter element 10 can be used as an air filter, in particular as an air filter of an internal combustion engine. In principle, however, use as an oil filter or fuel filter of similar design is also conceivable.

In FIG. 3A, a longitudinal section of the filter system 100 similar to the filter system of FIG. 3 but differing in providing a second end disk 18 having segment-shaped interrupted support knobs 20A. The filter system 100 has a tangential inlet 102, central outlet 104, and dirt outlet 106 at the bottom as illustrated. The housing 108 of the filter system 100 is closed off with a cover 110. A filter element 10 that is comprised of a support tube 14 arranged concentrically relative to longitudinal axis L and a filter body 12 is closed off at the two opposed end faces 15, 17 with a first end disk and a second end disk 16, 18 that may be embodied, for example, of polyurethane foam or an elastomer. Second end disk 18 and support tube 14 of the filter element 10 may be configured monolithically with each other.

The second end disk 18 may have stability is increased by an optional reinforcement plate 30. The second end disk 18 has segment-shaped interrupted support knobs 20A which project axially outwardly from the second end disk 18 are arranged circularly about the longitudinal axis L, generally on an imaginary circle and, upon mounting of the filter element in the housing 108 that is provided for housing the filter element, come to rest against a slanted surface or truncated conical surface 200 of an inner cover contour 114A of the cover 110 and fold or bend in radial direction 38 (in the illustrated example, outwardly) and, in this way, are supported axially as well as radially on the housing 108.

Figure 4:
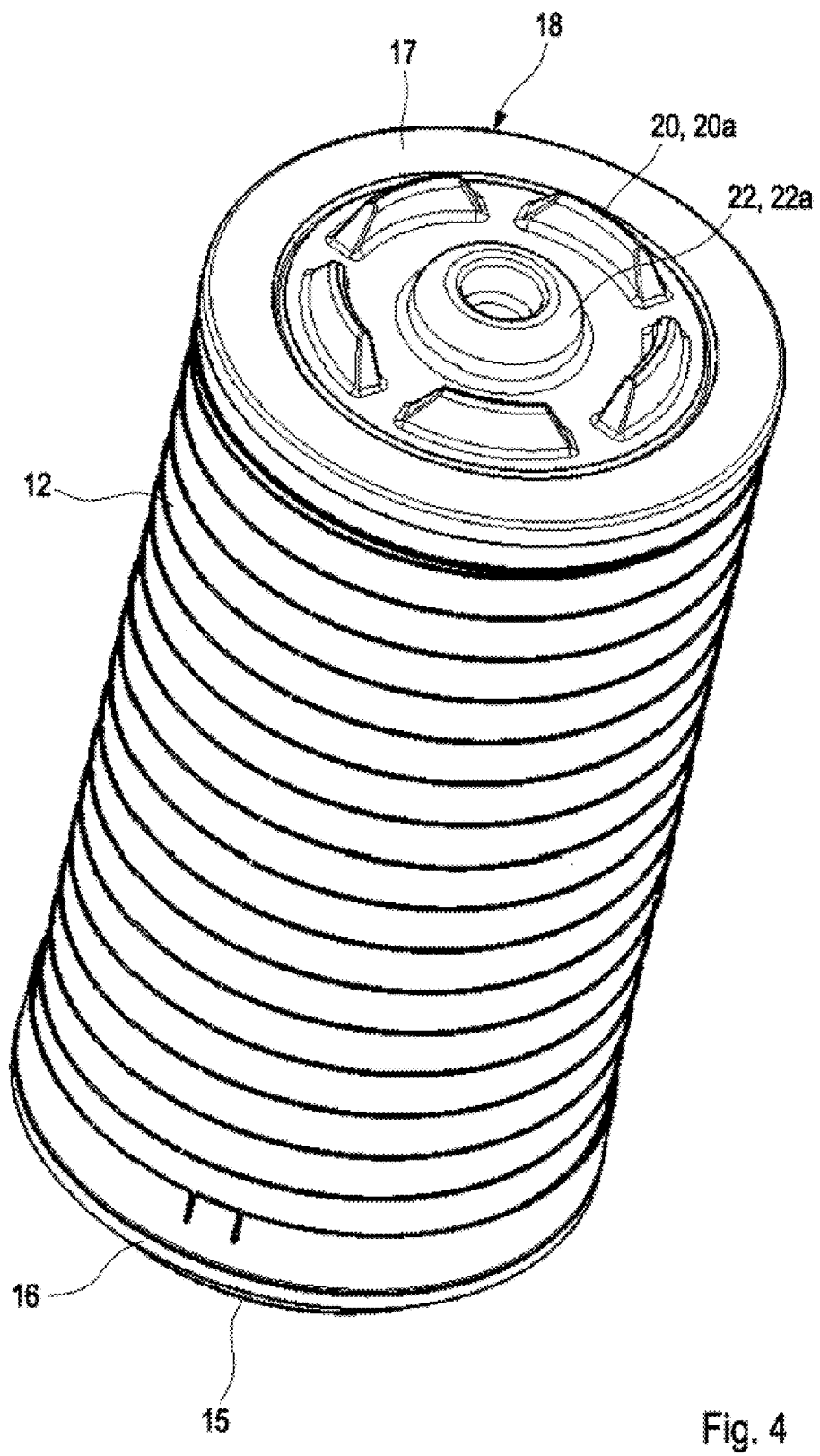
FIG. 4 shows a perspective illustration of a filter element according to one exemplary embodiment of the invention, with a view of the second end disk having a centering ring and support knobs.

FIG. 4 shows a perspective illustration of a filter element 10 that is formed from a filter body 12 and two end faces 15, 17 according to one exemplary embodiment of the invention, with a view of a second end disk 18 having a centering ring 22a and support knobs 20a. The end face 17 is defined by the end disk 18, which, for radially fixing the filter element 10 in the housing 110 [sic; 108] of a filter system as illustrated in FIG. 3, has a centering ring 22a as a centering element 22, as well as support knobs 20a as a support structure 20. Thus, a counterelement 24 of a cover 110, as shown in FIG. 3, can engage in the centering ring 22a and radially fix the filter element 10 in this manner. The support knobs 20, which, viewed in the radial direction, are located outside the centering ring 22a, lie against the truncated conical section of the inner cover contour 114 when the housing 108 is closed by the cover 110, and thereby fix the filter element 10 in the axial direction L.

Figure 4A:
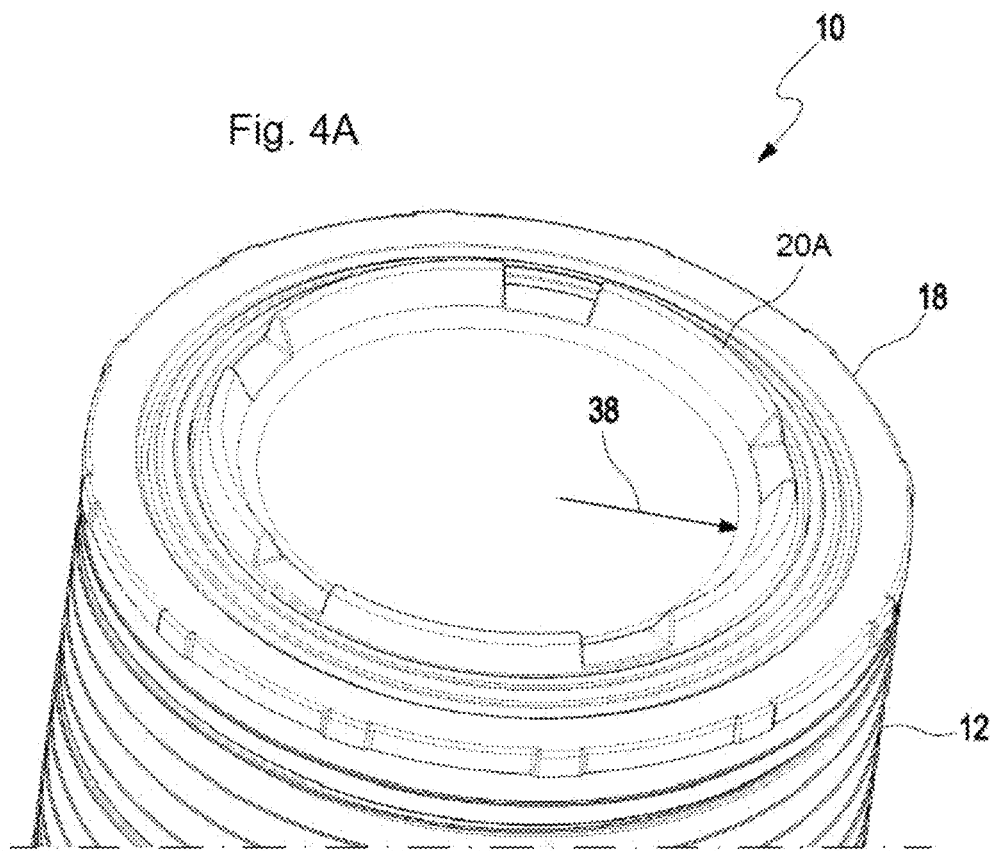
FIG. 4A is a perspective partial view of the filter element consistent with the embodiment of FIG. 3A having segment-shaped interrupted support knobs on the second end disk.

FIG. 4A shows a perspective partial view of a filter element 10 according to an embodiment of the invention with second end disk 18 and support knobs 20 arranged on and following an imaginary circle on the second end disk 18. It can be seen that the second end disk 18 seals off the filter medium 12 as a closure of the filter medium 12. In some embodiments, the second end disk may be an open end disk. On the second end disk 18, interrupted segments as support knobs 20 are provided on a circular area; upon installation in a housing and support on an inner cover contour, the support knobs 20 can bend or fold in radial direction 38, either outwardly or inwardly. In the exemplary illustration, the support knobs 20 fold or bend radially outwardly due to their engagement against the slanted surface 200 of the inner cover contour 114A. The slanted surface 200 or surfaces may form a portion of a generally conical surface configured to radially bend or deflect the support knobs 20.

Figure 5:
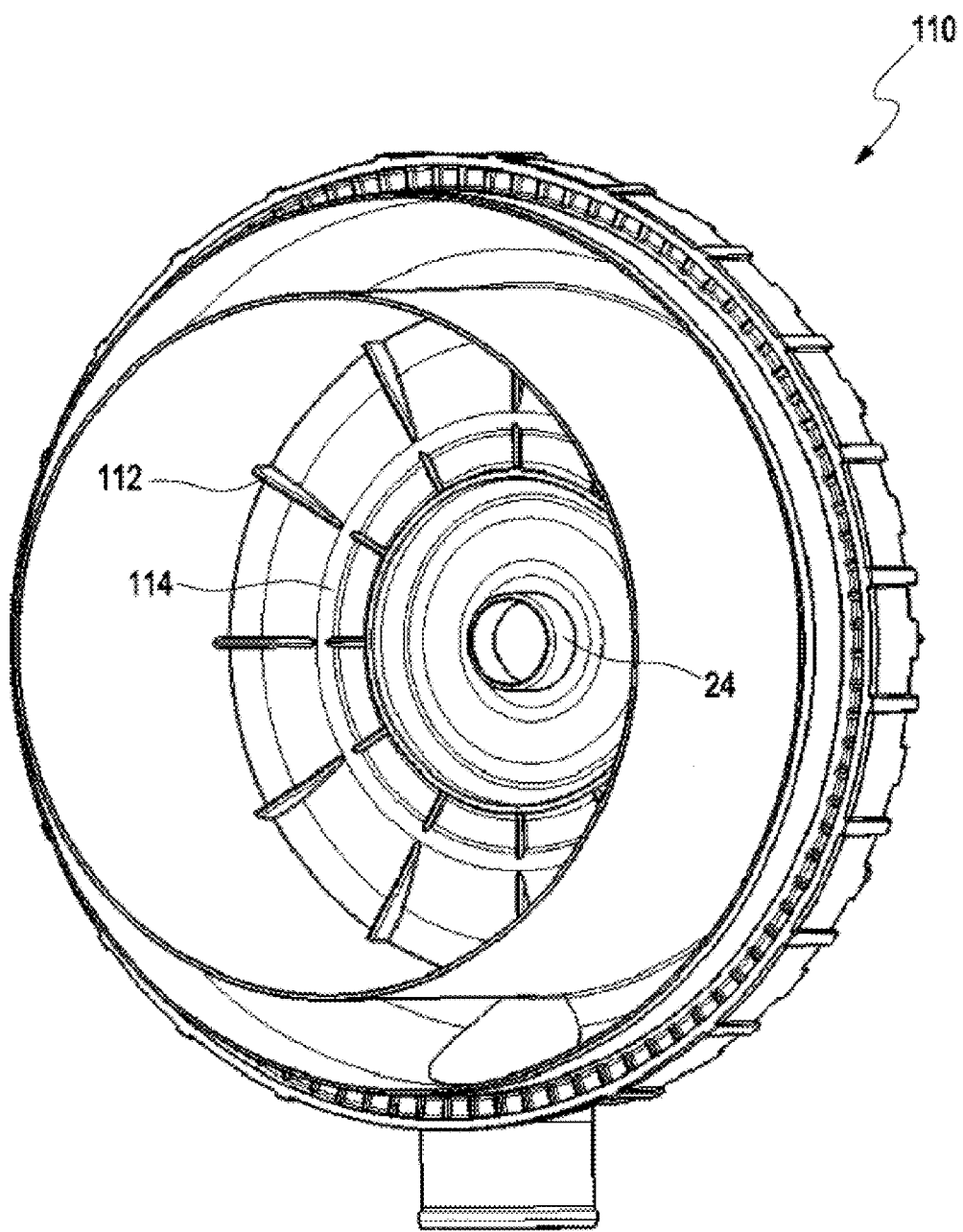
FIG. 5 shows a perspective illustration of the housing cover of a filter element according to one exemplary embodiment of the invention, having rib-shaped elevations in an inner cover contour.

FIG. 5 shows a perspective illustration of the housing cover 110, having rib-shaped elevations 112 of a filter element 10 according to one exemplary embodiment of the invention as shown in FIG. 3. As can be seen, a counter element 24 in the form of a hollow cylinder is situated centrally inside the cover 110, the hollow cylinder engaging in a centering ring 22a of the second end disk 18, when the filter element 10 is mounted in the housing 108 with the cover 110 closed. The support knobs 20a of the end disk 18 rest against the inner cover contour 114, and by means of the interlock with the rib-shaped elevations 112 provide rotationally fixed fastening of the filter element 10 in the housing 108.

Figure 5A:
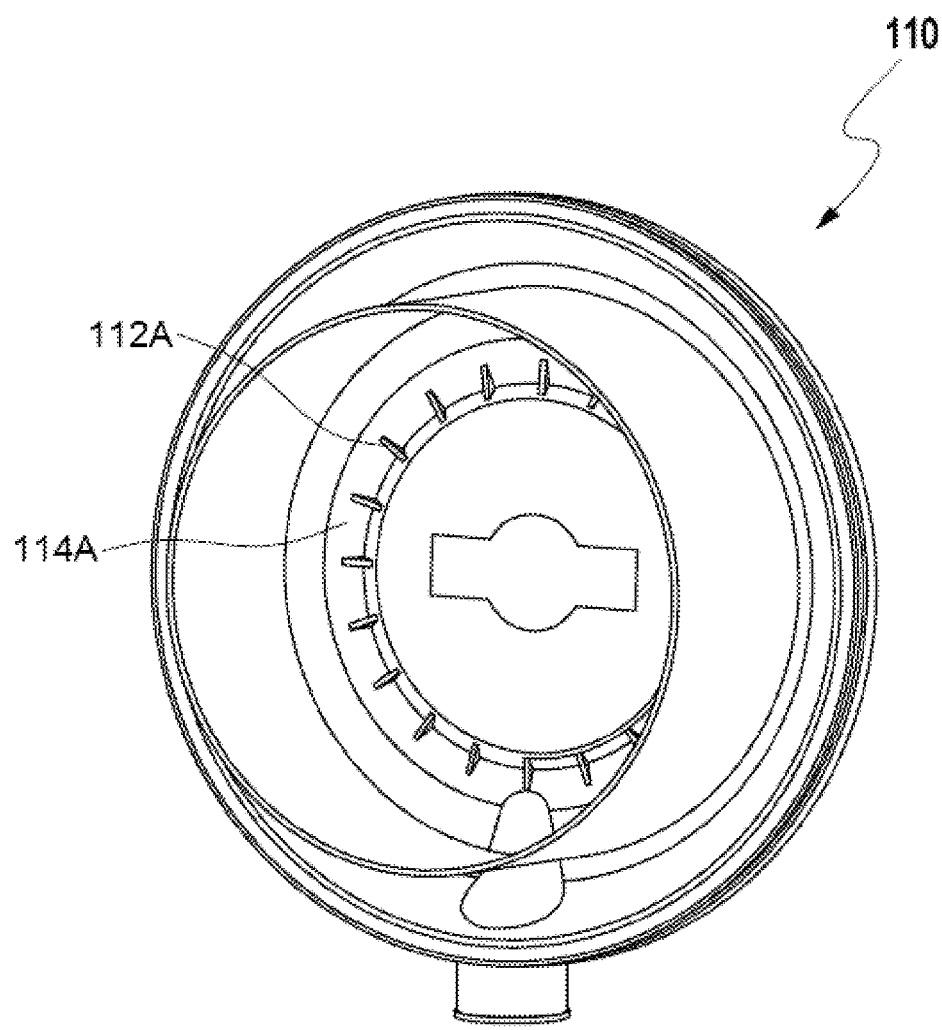
FIG. 5A is an inside view of a cover of a housing of a filter system with rib-shaped projections on the inner cover contour consistent with the embodiment of FIGS. 3A and 4A.

FIG. 5A shows the inner view of a cover 110 of a housing of a filter system consistent with the embodiment of the second end disk 18 and interrupted support knobs 20A of FIGS. 3A and 4A. The cover having rib-shaped projections 112A on the inner cover contour 114A according to an embodiment of the invention. By meshing with the support knobs 20A of a second end disk of a filter element, the rib-shaped projections 112A secure the filter element against rotation in operation by pressing the rib-shaped projections 112A into the elastic material of the interrupted support knobs 20A, securing the filter element against rotation even in case of a possible vibration excitation.

FIG. 6 illustrates a partial longitudinal section of a filter system 100 according to one exemplary embodiment of the invention, with the centering ring 22a and support knobs 20a in the second end disk. When the cover 110 is mounted on the housing 108, the counterelement 24 of the cover 110 engages in the centering ring 22a as a centering element 22 of the second end disk 18 of the filter element 10 so as to radially fix the filter element in this manner. In the drawing, the support knob 20a as a support structure 20 is shown penetrating the cover 110, and in actual implementation it is bent radially inwardly or outwardly by the inner cover contour 114 when the cover 110 is attached, resulting in axial bracing of the filter element 10 in the housing.

In FIG. 6A, a partial section view of a filter element 10 consistent with the embodiment of the second end disk 18 and interrupted support knobs 20A of FIGS. 3A, 4A and 5A, shown in the mounted state with elastically folded-over support knobs 20A is illustrated. In the section view, the folded-over support knobs 20A of the second end disk 18 can be seen which are pressed in radial direction 38 outwardly upon assembly by being pressed against the cover 110 and deflected by the slanted surface or annular truncated conical section 200 of the inner cover contour 114A. The second end disk 18 may also include a relief groove 22A to improve the folding action of the support knobs 20A. The second end disk 18 may include an optional projection 24C such that the folded-over support knobs 20A, in this case, are compressed between the projection 24C and cover contour 114A to more efficiently transfer axial forces to the second end disk 18.

Also illustrated in FIG. 6A is the support tube 14 that provides a stiff structure to the filter element 10 as well as the filter body 12 which engages the second end disk 18. Also illustrated is a reinforcement disk 30 which is embedded in the second end disk. The projection 24C, if provided, can be designed as a circumferentially extending ring which surrounds the circular area of the support knobs 20A or is segmented so as to match the segmented arrangement of the support knobs 20A.

Figure 6B:
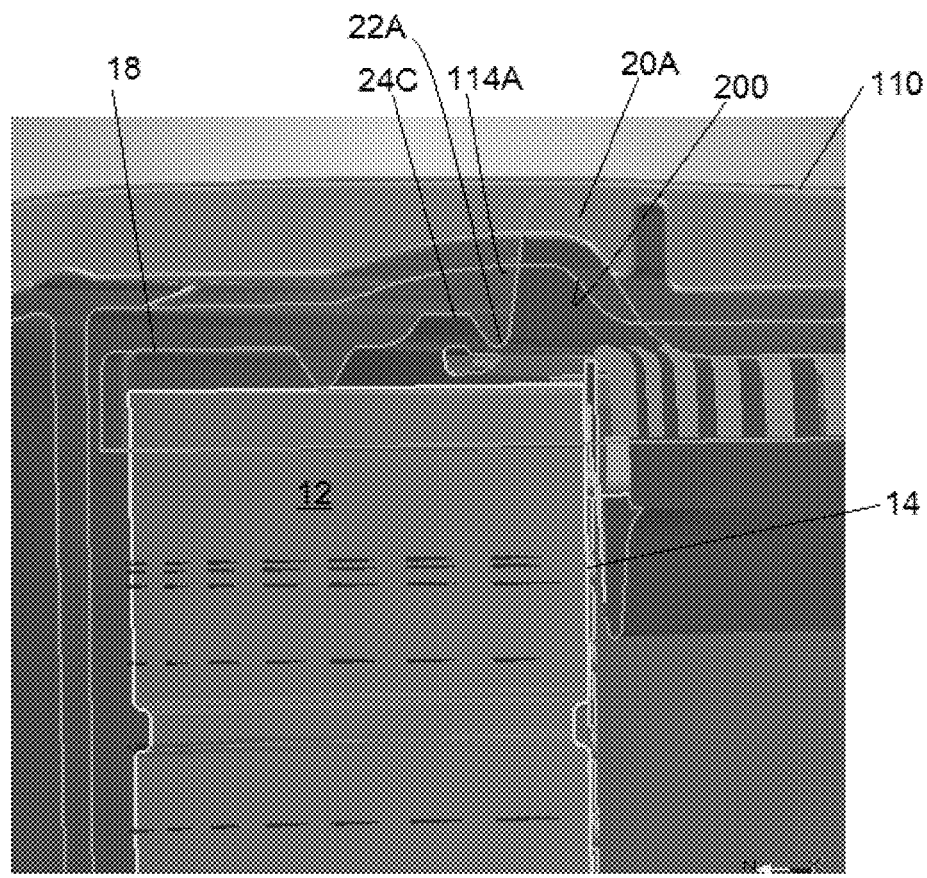
FIG. 6B is a partial cross-section view of the filter element consistent with the embodiment of FIGS. 3A and 4A, illustrated in the mounted state, with folded support knobs.

In FIG. 6B, similar to FIG. 6A, is a partial section view of a filter element 10 consistent with the embodiment of the second end disk 18 and interrupted support knobs, shown in the mounted state with elastically folded-over support knobs 20A is illustrated. In the section view, the folded-over support knobs 20A of the second end disk 18 can be seen which are pressed in radial direction outwardly upon assembly by being pressed against the truncated conical surface 200 of the inner cover contour 114A of the cover 110 and deflected by the truncated conical surface 200. In FIG. 6B, the support knob 20A is illustrated in an undeflected state, and so appears to project through the inner surface of the cover, however this is only an illusion of the CAD illustration. As can be seen and understood, upon installation, the support knobs 20A fold radially outwardly as they are pressed against and deflected by the annular truncated conical section 200 or slanted surface 200 and may be further compressed by connect of the optional projection 24A formed on the second end disk 18, further compressing the support knobs 20A against the inner cover contour 114A. Space may be formed by the inner cover contour 114A into which the deflected, deformed support knobs 20A can be compressed and received, the deflection of the support knobs 20A against the cover 11 generating an axial force on the second end disk 18. As can be seen, the support knobs 20A are aligned axially directly over the support tube 14 to transmit the generated axial forced through the support tube 14 to the opposite end disk and thereby prevent force loading of the filter medium.

Figure 7:
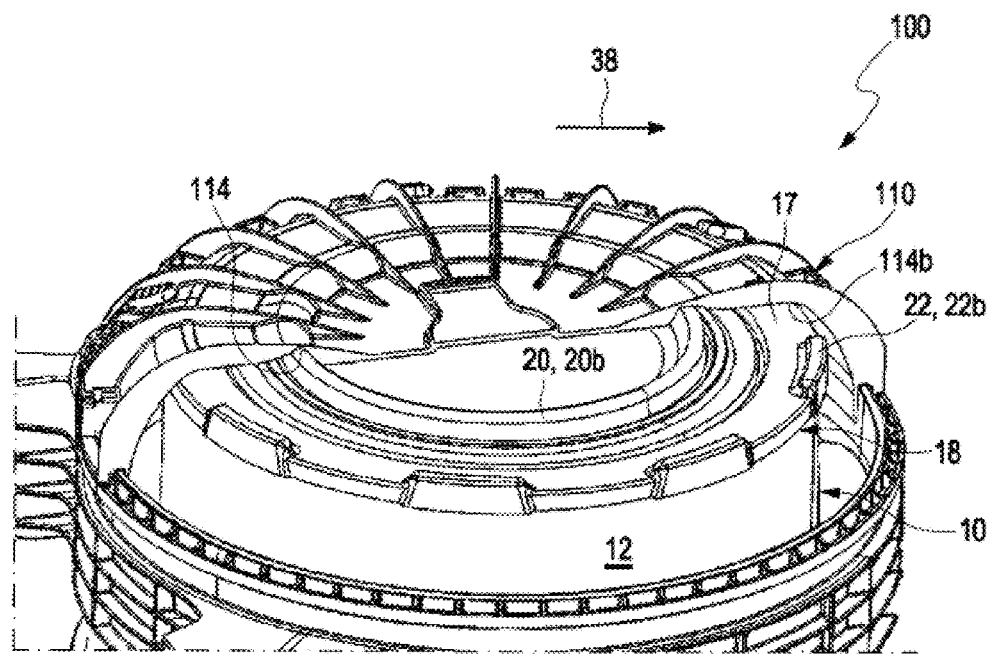
FIG. 7 shows a perspective illustration of a portion of a filter system, with a view of a second end disk having a closed ring as a support structure and supports knobs as a centering element according to another exemplary embodiment of the invention.

FIG. 7 shows a perspective illustration of a portion of a filter system 100 with a view of a second end disk 18, having the closed ring 20b as a support structure 20 and support knobs 22 as a centering element 22 according to another exemplary embodiment of the invention. In this exemplary embodiment, the second end disk 18 is configured such that the support knobs 22b as the centering element 22 are situated farther out in the radial direction 38 than the support structure 20, and when the cover 110 is placed on the housing 108, they result in pre-centering of the filter element 10 in the housing via the cover contour 114b, so that the filter element can be radially centered and guided during installation in the housing. The centering element 22 is arranged in such a way that during installation in the housing 108, it can be interlocked with rib-shaped elevations 112 in the inner cover contour 114b of the housing 108. Once the cover 110 is finally closed, the closed ring 20b rests against the inner cover contour 114, resulting in radial and axial support and bracing of the filter element 10 in the housing 108.

Figure 8:
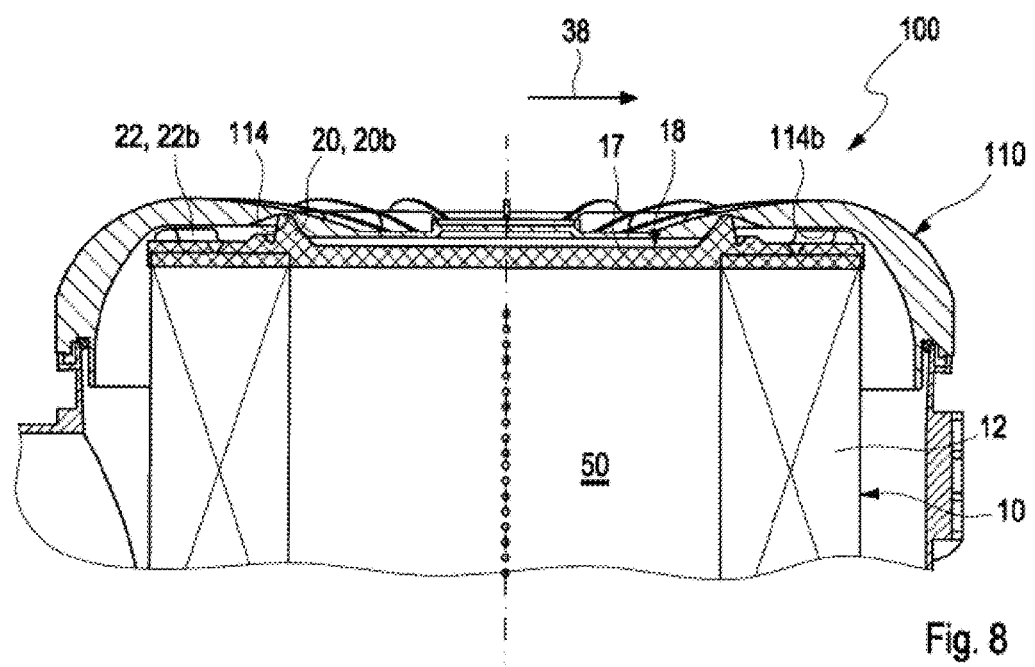
FIG. 8 shows a partial longitudinal section of a filter system according to the exemplary embodiment of the invention in FIG. 7.

This process is more clearly shown in FIG. 8 in a partial section of a filter system according to the exemplary embodiment of the invention in FIG. 7. The support knobs 22b result in pre-centering of the filtering element 10 lying against the inner cover contour 114b far to the outside, while the closed ring 20b, by resting against the cover contour 114 when the cover 110 is closed, results in stable radial bracing of the filter element 10 in the housing, the cover pressing against the closed ring 20b when the cover 110 is closed, thereby also providing for radial and axial bracing for fixing the filter element 10 in the housing 10.

What is claimed is:

1. A filter element comprising:
a filter body of a filter medium, the filter body having a longitudinal axis and a concentric shape relative to the longitudinal axis, the longitudinal axis defining an axial direction,
the filter body having a first axial end face and an opposing second axial end face;
a first open or closed end disk arranged at and secured onto the first end face;
a second end disk arranged at the second end face;
a support tube arranged concentric to the longitudinal axis and extending between the first and second end disks;
wherein at respective one of the first and second end disks includes
one or several support knobs of an elastic material, the one or several support knobs arranged in a circular arrangement on a respective one of the first or second end disks, projecting axially outwardly from the respective end disk,
wherein the one or several support knobs are configured and adapted for directly engaging and bending against a sloped or a truncated conical surface of a housing into which the filter element is installable;
wherein the one or several support knobs are configured to deflect or fold in a first radial direction inwardly or outwardly towards a first radial side of the one or several support knobs, the deflection or folding of the one or several support knobs generating an axial force onto the respective end disk, the axial force applying a compressive force to the filter element to axially and radially clamp and hold the filter element in position in the housing;
wherein the respective end disk having the one or several support knobs, further has a relief groove or depression formed into the respective end disk at the first radial side of the one or several support knobs, the relief groove or depression facilitating deflection or folding of the one or several support knobs in the first radial direction.

2. The filter element according to claim 1, wherein
an underside of the one or several support knobs is arranged directly axially above the support tube;
wherein the support tube cooperates with the one or several support knobs to transmit axial forces generated by the one or several support knobs through the support tube to the axially opposite end disk, thereby bypassing the generated axial forces around the filter medium.

3. The filter element according to claim 1, wherein
the support tube having an L-shaped cross section,
a first leg of the L-shaped cross section formed by a tubular body of the support tube;
a second leg of the L-shaped cross-section formed by a radially outwardly extending annular leg of the support tube, the annular leg arranged on an axial end of the tubular body and embedded into the end disk having the one or several support knobs.

4. The filter element according to claim 3, wherein
the annular leg is arranged axially underneath and axially supporting the one or several support knobs and positioned axially between the one or several support knobs and the filter media;
wherein the support tube and annular leg cooperate to transmit axial forces generated by the one or several support knobs through the support tube to the axially opposite end disk, thereby bypassing the generated axial forces around the filter medium.

5. The filter element according to claim 2, wherein
an axial end of the support tube is embedded into the end disk having the one or several support knobs forming a monolithic component.

6. The filter element according to claim 3, wherein
the annular leg arranged on the axial end of the tubular body is embedded into the material of the end disk and is positioned axially directly under the one or several support knobs to receive axial forces therefrom.

7. The filter element according to claim 1, wherein
wherein the end disk having the one or several support knobs as well as the one or several support knobs is comprised of a polyurethane foam or an elastomer;
wherein the one or several support knobs are formed together with the end disk as a single, unitary, one-piece component.

8. The filter element according to claim 1, wherein
the first or the second end disk is an open end disk and has a radial seal that seals against and interior of a housing into which the filter element is installable.

9. The filter element according to claim 1, wherein
the filter medium is selected from the group consisting of paper, paper reinforced with plastic fibers, and plastic-coated paper, and combinations thereof;
wherein the filter body has a folded zigzag shape and is annularly closed.

10. The filter element according to claim 1, wherein
the one or several support knobs are several support knobs arranged in a circular arrangement to line on and follow and imaginary circle on the respective end disk;
wherein the several support knobs are arcuate, each elongated along, following and forming a portion of the imaginary circle;
wherein the support knobs are arranged to have gaps between adjacent support knobs on the imaginary circle.

11. The filter element according to claim 10, wherein
the gaps between adjacent support knobs in the circular arrangement are uniform.

12. The filter element according to claim 10, wherein
wherein the gaps between the adjacent support knobs in the circular arrangement are non-uniform.

13. The filter element according to claim 1, wherein
the one or several support knobs are arranged at and secured directly onto the support tube of the filter element.

14. The filter element according to claim 1 is an air filter.

15. A filter system comprising:
a housing having a longitudinal axis and a substantially concentric shape relative to the longitudinal axis;
a filter element according to claim 1 disposed exchangeably in the housing;
a housing end or housing cover closing off the housing and concentrically configured relative to the longitudinal axis, the cover having
a slanted surface or an annular truncated conical surface formed into an interior surface of the housing and aligned with and configured to engage respective ones of the one or several support knobs of the filter element to force the support knobs to deflect or fold in a radial direction inwardly or outwardly against the slanted or annular truncated conical surface, the deflection or folding of the one or several support knobs generating an axial force onto the respective end disk, the axial force applying a compressive force to the filter element to axially and radially clamp and hold the filter element in position in the housing.

16. The filter system according to claim 15, further comprising:
a cyclone separator that is disposed in the area of the inlet and
further comprising a dirt outlet disposed on the housing or on the cover.

17. The filter system according to claim 15, further comprising
a secondary element disposed into an interior of the filter element in the housing,
wherein the secondary element is connected to the housing such that the secondary element remains in the housing when the filter element is exchanged.

18. The filter system according to claim 15, wherein
the one or several support knobs are several support knobs arranged in a circular arrangement to line on and follow and imaginary circle on the respective end disk;
wherein the several support knobs are arcuate, each elongated following and forming a portion of the imaginary circle;
wherein the support knobs are arranged to have gaps between adjacent support knobs on the imaginary circle;
the second end disk and the support tube together are formed as a monolithic component.

* * * * *